United States Patent [19]

Kirch et al.

[11] Patent Number: 4,754,363

[45] Date of Patent: Jun. 28, 1988

[54] METAL-ENCAPSULATED GAS-INSULATED HIGH-VOLTAGE INSTALLATION WITH AN OVERVOLTAGE ARRESTER

[75] Inventors: Johannes Kirch; Egon Zemann, both of Berlin, Fed. Rep. of Germany

[73] Assignee: Siemens Aktiengesellschaft, Berlin and Munich, Fed. Rep. of Germany

[21] Appl. No.: 10,486

[22] Filed: Feb. 3, 1987

[30] Foreign Application Priority Data

Feb. 13, 1986 [DE] Fed. Rep. of Germany ....... 3604785

[51] Int. Cl.[4] ......................... H02H 9/06; H02H 3/22

[52] U.S. Cl. ..................................... 361/120; 361/124; 361/125

[58] Field of Search ........................ 361/111, 117–120, 361/124, 125, 134–136

[56] References Cited

U.S. PATENT DOCUMENTS

| | | | |
|---|---|---|---|
| 2,158,859 | 5/1939 | Horikoshi | 361/125 |
| 2,174,477 | 9/1939 | Pittman et al. | 361/124 X |
| 2,315,320 | 3/1943 | Earle | 361/125 |
| 2,504,438 | 4/1950 | McFarlin | 361/124 X |
| 2,989,608 | 6/1961 | Hicks | 200/115 |
| 3,875,466 | 4/1975 | Jakszt | 317/62 |
| 3,909,676 | 9/1975 | McConnell | 361/135 |
| 4,015,228 | 3/1977 | Eda et al. | 361/124 X |
| 4,318,153 | 3/1982 | Fasano | 361/124 X |
| 4,503,414 | 3/1985 | Sykes et al. | 361/125 X |

FOREIGN PATENT DOCUMENTS

| | | | |
|---|---|---|---|
| 1289174 | 3/1963 | Fed. Rep. of Germany | 361/124 |

*Primary Examiner*—G. P. Tolin
*Assistant Examiner*—A. Jonathan Wysocki
*Attorney, Agent, or Firm*—Kenyon & Kenyon

[57] ABSTRACT

In a metal-encapsulated gas-insulated high-voltage installation with an overvoltage arrester which is arranged in a separate encapsulation and is connected via a gastight feedthrough to the conductor of the high-voltage installation, fault arcs can lead to heavy stresses of the overvoltage arrester by dynamic forces due to overloading. In order to prevent this, there are provided in the connection between the feedthrough and the overvoltage arrester two electrode-shaped support bodies, between which a flexible current-carrying ribbon is arranged. The cross section of the current-carrying ribbon is designed so that it melts at currents of a magnitude which is equal to or larger than that required for the pressure relief of the overvoltage arrester after the arc has been blown out of the arresting housing. Thereby, the overvoltage arrester and the feedthrough are mechanically decoupled.

4 Claims, 1 Drawing Sheet

METAL-ENCAPSULATED GAS-INSULATED HIGH-VOLTAGE INSTALLATION WITH AN OVERVOLTAGE ARRESTER

BACKGROUND OF THE INVENTION

The present invention relates to a metal-encapsulated gas-insulated high-voltage installation with an overvoltage arrester which is likewise accommodated in a separate gas-filled encapsulation which is connected to the encapsulation of the high-voltage system by means of a gas-tight feedthrough and comprises means which, after having responded, blow the arc from its housing into the encapsulation.

Such a metal-encapsulated gas-insulated high-voltage installation which may be a high-voltage switch gear or a high-voltage line, is known from DE-AS No. 22 47 996 corresponding to U.S. Pat. No. 3,875,466. In the known high-voltage installation, the separate encapsulation is filled either with air or a gas advantageous for the operation of the overvoltage arrester; however, it can also be filled with the same gas which is provided for the insulation of the entire system, particularly $SF_6$. The overvoltage arrester is of conventional design and consists of spark gaps and voltage-dependent resistors or metal oxide resistors without spark gaps. It is furthermore provided with means which, if it is overloaded, allow the arc to leave its housing so that the arc then burns in the encapsulation between the overvoltage arrester and the wall of the encapsulation. Normally, the current load is relatively small if the overvoltage arrester responds upon being triggered by overvoltages. If however, a defect arc is brought about by an overload of the overvoltage arrester, very large currents can flow which stress the branch with the overvoltage arrester by large dynamic forces and can result in damage or destruction of the overvoltage arrester and possibly of the feedthrough.

SUMMARY OF INVENTION

It is an object of the present invention to provide the branch of the high-voltage system with the overvoltage arrester in such a manner that the dynamic stress in the event of a fault arc with large short circuit currents in the overvoltage arrester and the branch is under control.

The above and other objects of the present invention are achieved by a metal-encapsulated gas-insulated high-voltage installation having an overvoltage arrester accommodated in a gas filled separate encapsulation which is connected to the encapsulation of the high-voltage installation by means of a gas tight feedthrough and comprises means which after it has responded, blow the arc from its housing into the encapsulation, between the feedthrough and the overvoltage arrester, two electrode-shaped support bodies with rounded surfaces facing each other being provided, a flexible current-carrying ribbon being arranged therebetween, the cross section of the ribbon being designed so that the current-carrying ribbon melts at currents of a magnitude which is equal to or greater than that required for the pressure relief in the overvoltage arrester after the arc has been blown out of the arrester housing.

By using a current-carrying ribbon which melts at definite current values, an intended breaking point is created in the connection between the feedthrough and the overvoltage arrester which in the case of trouble causes mechanical decoupling. Thereby, the dynamic forces occurring in the event of large short circuit currents are kept away from the overvoltage arrester and the feedthrough. In addition, the one base of the arc which burns in the encapsulation and has first been blown out of the overvoltage arrester is shifted to the support body connected to the feedthrough, which thereby acts like a burnoff electrode.

It is therefore advantageous to make this support body adjacent to the feedthrough so as to be burnoff-proof, i.e., to either equip it with sufficiently great wall thicknesses or to make it of a burnoff-product material. Advantageously, also the surface of the support body adjacent to the feedthrough will be chosen larger than that of the support body adjacent to the overvoltage arrester. Thereby, sufficient possibility is provided for the arc base to travel on this support body.

The flexible current-carrying ribbon can be fastened in a suitable manner to the support bodies, for instance, by a screw connection. In order to avoid a rigid connection to the support body, it is advisable to arrange the flexible current-carrying ribbon on a coil spring and to insert the latter between the surfaces of the support bodies. In this case, the flexible current-carrying ribbon melts first and the coil spring is then compressed by the current forces and jumps out of its holder so that the connection between the support bodies is interrupted.

BRIEF DESCRIPTION OF THE DRAWINGS

The invention will be explained in greater detail in the following detailed description with reference to the drawings, in which.

DETAILED DESCRIPTION

Figure 1:
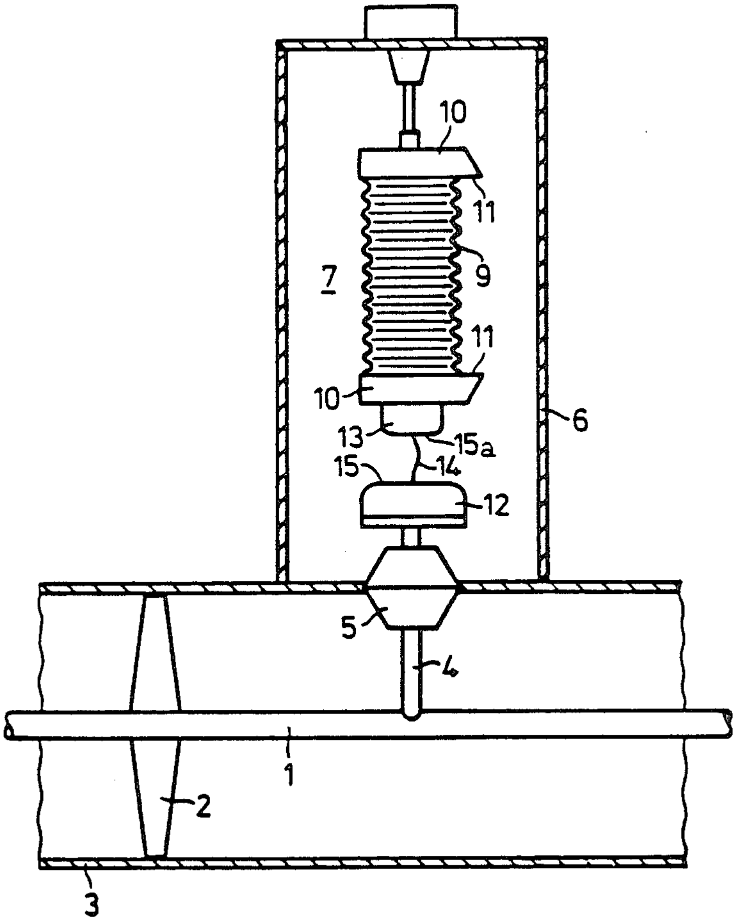
FIG. 1 shows schematically part of a metal-encapsulated high-voltage line with an overvoltage arrester which is accommodated in a separate encapsulation.

The tubular conductor 1 of a metal-encapsulated high-voltage line, pressurized gas-insulated with $SF_6$ between the power station generator and the transformer is held at a distance from the encapsulation 3 by insulators 2. In the course of the tubular conductor 1, a branch 4 is provided which leads to a feedthrough 5 which is designed pressureproof and overvoltage arrester 7 is located. The overvoltage arrester 7 has a housing 9 of insulating material, for instance, porcelain or plastic, in which spark gaps and voltage-dependent resistors or only voltage-dependent resistors are located. In addition, special means 11 which make it possible to blow out the fault arc after the overvoltage arrester 7 is overloaded are provided at the upper and lower flange 10 of the overvoltage arrester 7, so that the later then burns in the encapsulation 6, its upper base passing to the wall of the encapsulation 6.

In the connection between the feedthrough 5 and the overvoltage arrester 7 are arranged two electrode-shaped support bodies 12, 13 which are connected to each other by a flexible current-carrying ribbon 14. The support bodies 12 and 13 have rounded surfaces 15, 15*a* facing each other so that they do not influence the electric field adversely. The diameter of the support body 12 adjacent to the feedthrough 5 is larger than that of the other one; similarly, also the surface 15, 15*a* is larger.

The flexible current-carrying ribbon 14 may comprise strips or wire of copper and is screwed to the surfaces 15, 15*a* the support bodies 12, 13. The cross section of the flexible current-carrying ribbon 14 is designed so that the current ribbon 14 melts with currents of the same or greater magnitude than is necessary for blowing out the arc. Thereby, the connection between the feedthrough 5 and the overvoltage arrester 7 is interrupted after the short circuit in the overvoltage arrester 7 occurs, so that mechanical decoupling is brought about. The large dynamic forces connected with such short circuit currents are therefore kept away from the overvoltage arrester 7 and reactions of the overvoltage arrester 7 on the feedtrhough 5 are avoided.

After the flexible current-carrying ribbon has melted, the lower base of the arc remains on the support body 12 adjacent to the feedthrough 5. Its large surface 15 makes available enough space for the base of the fault arc to travel. So that the support body 12 is not damaged excessively if the fault arc burns within the encapsulation 6, the former is also made burnoff-proof.

Figure 2:
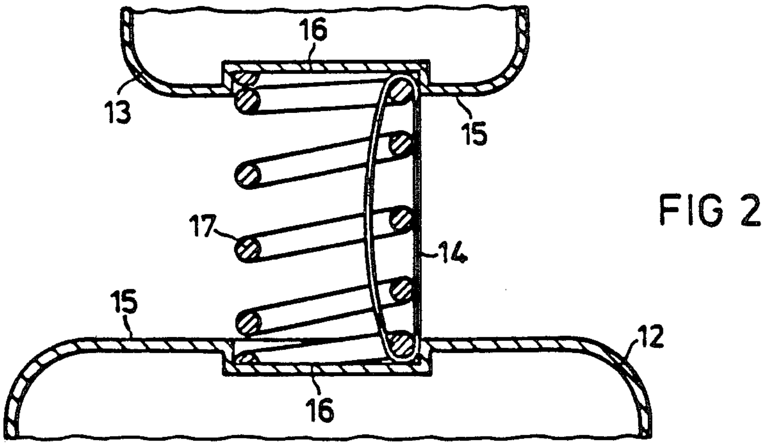
FIG. 2 shows a somewhat modified embodiment of the connection between the overvoltage arrester and the high-voltage line in detail.

FIG. 2 shows as a second embodiment a somewhat modified design of the connection between the two support bodies 12 and 13. The latter are provided at their surfaces 15 with a recess 16 each into which a coil spring 17 of steel is inserted. This coil spring 17 carries the flexible current-carrying ribbon 14.

Thus, there is no direct rigid connection between the current carrying ribbon 14 and the support bodies 12 and 13. If the arrangement is stressed by large short circuit currents after the overvoltage arrester 7 has responded, the current-carrying ribbon 14 which consists of copper, melts through first, since the predominant part of the current flows through the current-carrying ribbon 14 because of the different conductivities. At the same time, the coil spring 17 is compressed by the current forces and jumps out of the recesses 16 so that the connection between the support bodies 12 and 13 is interrupted and the mechanical decoupling is made.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A metal-encapsulated gas-insulated high-voltage installation having an overvoltage arrester accommodated in a gas filled separate encapsulation which is connected to the high-voltage installation by means of a gas tight feedthrough and comprises means which after it has responded blow an arc from a housing of the arrester into the encapsulation, two electrode-shaped support bodies with rounded surfaces facing each other being provided between the feedthrough and the overvoltage arrester, a flexible current-carrying ribbon being arranged between the two electrode-shaped support bodies, the cross section of the ribbon being designed so that the current-carrying ribbon melts at a current of a magnitude which is equal to or greater than that required for the pressure relief in the overvoltage arrester after the arc has been blown out of the arrester housing.

2. The metal-encapsulated gas-insulated high-voltage installation recited in claim 1, wherein the flexible current-carrying ribbon is held by a coil spring inserted between the surfaces of the support bodies.

3. The metal-encapsulated gas-insulated high-voltage installation recited in claim 1, wherein the surface of the support body adjacent to the feedthrough is larger than the support body adjacent to the overvoltage arrester.

4. The metal-encapsulated gas-insulated high-voltage installation recited in claim 1, wherein the support body adjacent to the feedthrough is burnoffproof.

* * * * *